May 27, 1952     W. V. THELANDER     2,597,911
FRICTION CLUTCH PLATE
Filed Nov. 4, 1948
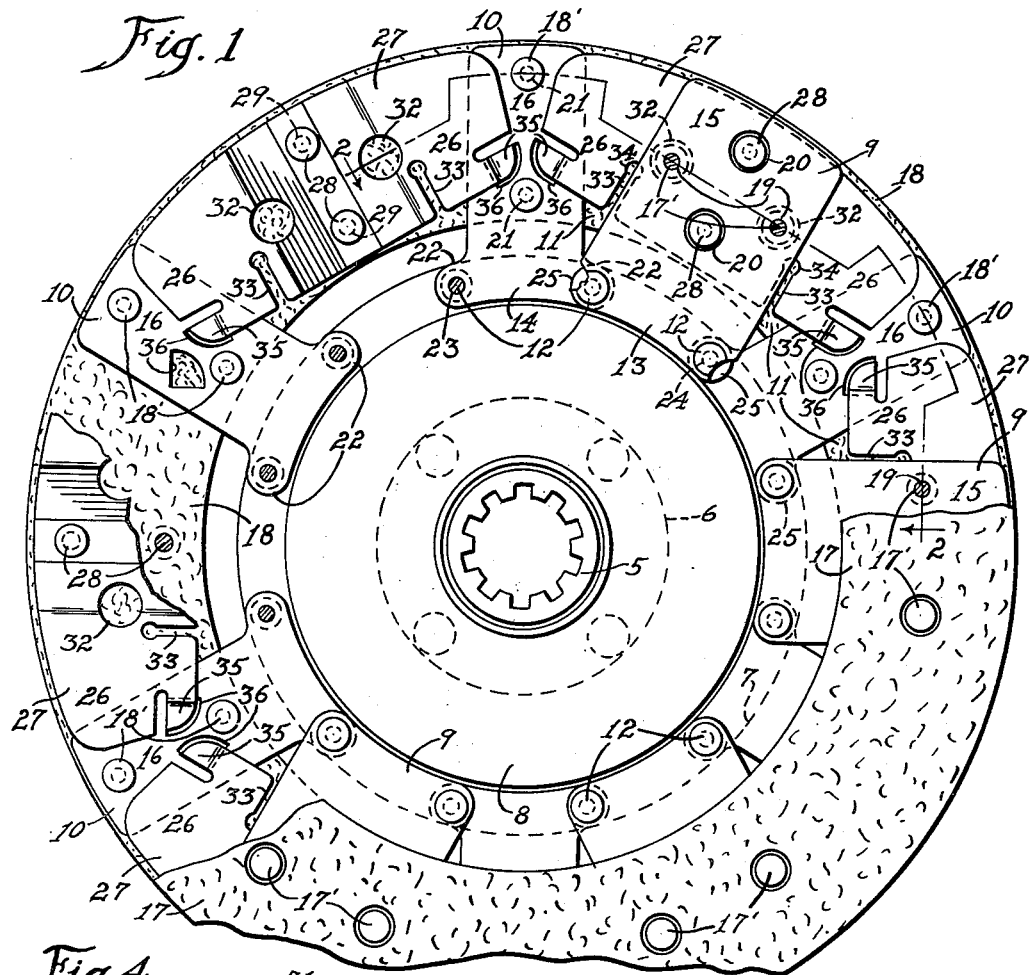
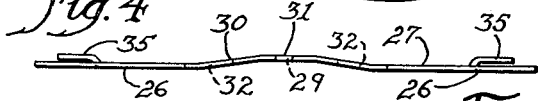
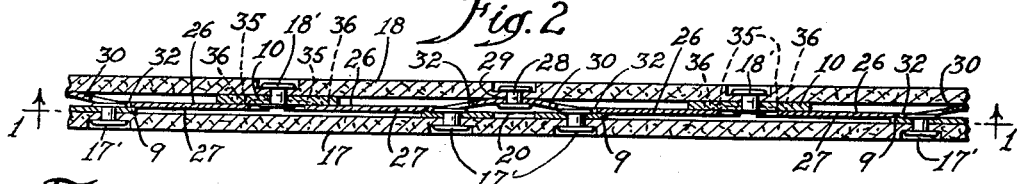
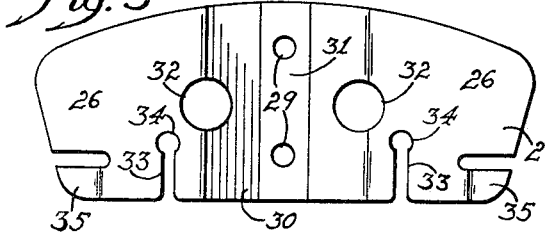
Inventor:
W. Vincent Thelander Patented May 27, 1952

2,597,911

UNITED STATES PATENT OFFICE 2,597,911

FRICTION CLUTCH PLATE

W. Vincent Thelander, Auburn, Ind., assignor to Dana Corporation, Toledo, Ohio, a corporation of Virginia Application November 4, 1948, Serial No. 58,280

2 Claims. (Cl. 192—107)

This invention relates to clutches and is more particularly concerned with an improved driven member or plate for automotive type friction clutches.

One of the principal objects of my invention is to provide a clutch plate of sectional construction utilizing a number of small sheet metal stampings that are as nearly rectangular in form as possible to build up the outer annular portion of the plate on which the annular facings are mounted, it being possible to produce rectangular or nearly rectangular stampings with much less waste than is involved in the stamping of segments of other shapes or large disks, and it being also possible to produce rectangular or nearly rectangular stampings from scrap material with less waste, so that the present structure is made available at much lower cost than would otherwise be possible. The present plate has, furthermore, been so designed that half of the stampings are of identical form and the other half are likewise of identical form, thus further reducing the cost of manufacture and simplifying as well as speeding up assembling.

Another important object of my invention is to provide an improved "mush" construction between the friction facings, which construction embodies elongated, substantially flat, leaf springs bowed only in the middle portion where they are attached directly to the inner side of one of the two friction facing rings, each between two of the flat sheet metal segments that are riveted to the same facing ring for its support, the flat opposed end portions of the leaf spring overlapping adjacent portions of neighboring segments and being also in engagement with the lateral edge portions of another segment disposed between the first named segments and riveted to the inner side of the other friction facing ring and disposed on the opposite side of the leaf spring from the first-mentioned segments. With these substantially flat leaf springs as compared with the use of struck-out ears commonly provided as integral portions of clutch plates, I obtain an appreciable saving in cost of manufacture, because of the lower cost of the sheet metal segments making up the bulk of the annular portion of the plate as compared with the higher cost of spring steel used in the leaf springs, and the fact that the leaf springs can be riveted directly onto one of the friction facing rings along with one set of the segments instead of having to be riveted or welded first to one set of segments simplifies assembling and lowers the cost of production, and the final product is not only more uniform but better in various other respects. Thus, for example, the present construction reduces the difficulty in obtaining clutch plates in quantity production of uniform thickness in the facing portion and with the facings in substantial parallelism throughout the circumference, whereas with many earlier designs and constructions such uniformity in thickness and parallelism of facings was difficult to obtain in quantity production, and as a result those plates when installed did not give as good performance nor did they last as long as might otherwise be expected.

Another feature of the present invention is the provision of sliding connections between the outer end portions of the leaf springs and the segments overlapped thereby, whereby to relieve the friction facing material of strains due to centrifugal force acting on the leaf springs, which force at higher speeds might otherwise tend to cause a fraction of the facing material, and, of course, the breaking off of one or more portions of the facing with the leaf springs thereon would throw the plate out of dynamic balance and necessitate repair or replacement of the plate.

The invention is illustrated in the accompanying drawings, in which—

Fig. 1 is a rear view of a clutch plate made in accordance with my invention, a portion of the one friction facing ring being removed to better illustrate the mush construction, the latter being viewed on the line I—I of Fig. 2;

Fig. 2 is a section on the broken arcuate line 2—2 of Fig. 1, and

Figs. 3 and 4 are a face view and edgewise view, respectively, of one of the leaf springs removed from the clutch plate and shown full size.

The same reference numerals are applied to corresponding parts throughout these views.

The clutch plate shown comprises relatively rotatable inner and outer portions, the inner portion being formed by a center hub 5 splined for driving connection with the driving shaft of an automotive transmission and provided with an annular flange 6 onto which notched plates are riveted for oscillatory movement with the hub relative to a ring 7 that is notched in register with the notching of the aforesaid plates for cooperation with a plurality of spring cushioning assemblies inside the housing 8, as disclosed, for example, in my Patent No. 2,337,135. When relative movement occurs between the hub 5 and ring 7, that is to say between the inner and outer portions of the clutch plate, the springs of said assemblies are compressed to cushion the drive and absorb vibrations, as well known in this art.

The outer portion of the plate contains the mush construction with which my invention is particularly concerned. There are two series of stamped sheet metal segments 9 and 10, made of tempered spring steel of preferably reduced thickness, the segments of both series being circumferentially spaced and the segments 9 of one series being in staggered relation to the segments 10 of the other series, and the spaces between segments being wider than the segments, as indicated by the spaces 11 in Fig. 1, so that the segments, which are fastened to housing 8 by rivets 12 entered through registering holes in the overlapped ends of the attaching portions 13 and 14 of the segments, are received in these spaces when the outer annular portion of the plate is compacted upon engagement of the clutch. That is to say, the segments 9 and 10 have their radially projecting outer portions 15 and 16 brought more or less into coplanar relationship when the plate is compressed between the pressure plate and flywheel in the engagement of the clutch. The spaced parallel friction facing rings or pads 17 and 18 are fastened to the outer faces of segments 9 and 10, respectively, by rivets 17' and 18', respectively, the facing ring 17 being arranged to be engaged by the pressure plate and the facing ring 18 being arranged to engage the flywheel. Segments 9 are substantially rectangular in form, and each has two holes 19 therein in laterally spaced relation to receive the rivets 17' for fastening facing ring 17 thereto, and has two other larger holes 20 therein in longitudinally spaced relation on the radial center-line thereof for a purpose that will soon appear. The other segments 10 are also substantially rectangular in form, but considerably narrower than segments 9, and each has two holes 21 provided therein in longitudinally spaced relation on the radial center-line thereof to receive the rivets 18' for fastening facing ring 18 thereto. The attaching portions 14 of the narrower segments 10 are of the same width as the attaching portions 13 of segments 9, and in that way ears 22 are formed projecting from the opposite sides of the inner ends of these segments. The holes 23 in these ears register with holes 24 in the segments 9 and receive the rivets 12 for fastening the segments 9 and 10 to the rim portion of the housing 8. Spacing washers 25 are inserted between the attaching portions 13 and 14 of segments 9 and 10 so as to space the outer portions 15 and 16 of the segments in closely parallel planes leaving room between the planes of the segments for the end portions 26 of the substantially flat leaf springs 27, which are of approximately the same thickness as the washers 25, or less. There is one of these leaf springs riveted to the friction facing ring 18 in each of the spaces between the segments 10, two rivets 28 being entered through two holes 29 provided on the radial center-line of the leaf spring to fasten the same directly to the inner side of the friction facing ring 18. Each of these leaf springs is of elongated form having its radially outer longitudinal edge on an arc nearly coincident and concentric with the outer edge of the friction facing ring 18, and is substantially flat with the exception that the middle portion 30 is bowed to offset the rather narrow radially extending flat attaching portion 31 slightly relative to the coplanar flat end portions 26 and in parallel relation thereto. The offset is equivalent to the thickness of the segments 10, so as to permit riveting the attaching portion 31 of each leaf spring 27 directly to the inner side of the friction facing ring 18 and have the end portions 26 overlap portions of adjacent segments 10 and lie normally in parallel relation thereto. The end portions 26 also engage the lateral edge portions of the segments 9, and the holes 32 in the end portions 26 register with the heads of rivets 17' on segments 9 and provide operating clearance with respect to these heads. The holes 20 on segments 9 register with the heads of rivets 28 and afford operating clearance with respect to these heads. There is, therefore, nothing to interfere with the "packing" tightly together of the parts of the mush construction in the engagement of the clutch. Two parallel slots 33 are provided in the flat end portions 26 of each leaf spring 27 opening from the inner edge thereof and located so that the lateral edges of the segment 9 associated therewith coincide substantially with the center-lines of these slots, as clearly appears in Fig. 1, whereby to reduce more or less, according to the length of the slots, the packing pressure on the internal diameter of the friction facings by allowing the extreme outer end portions of the leaf spring to conform more readily in their deflection to the inclination of the segments 10 in the packing together of the parts in the engagement of the clutch, while the rest of the flat end portions 26 conform more or less readily to the inclination of the segments 9, the result being that the packing pressure on the internal and external diameters of the friction facings is substantially equal. The ends of the slots 33 are preferably enlarged in a circle, as indicated at 34, to distribute the internal stresses set up in this flexing of adjoining portions of the leaf springs in different directions, so that there will be less likelihood of the metal fatiguing and eventually cracking.

In operation, it should be clear that when the pressure plate is moved toward the flywheel in the engagement of the clutch, the facings 17 and 18 are pressed together, thereby flexing the segments 9 and 10 toward coplanar relationship and correspondingly flexing all of the leaf springs 27, which normally tend to resist the packing together of these parts forming the outer portion of the plate, thus insuring the desired smooth engagement of the clutch and avoiding grabbing. The nearly flat V formed by the slightly inclined portions 30 of the bowed intermediate portion of each leaf spring is flattened still further by pressure of the adjoining segments 9 against the outer ends of these inclined portions, as will be best understood by reference to Fig. 2, and, of course, these leaf springs exert increasing spring pressure on the facings 17 and 18 as full engagement of the clutch is approached, because as the V formed by the inclined portions 30 becomes more and more flattened toward a straight line, there is also an increased flexing of the flat end portions 26 as the segments 9 and 10 are crowded more and more closely into coplanar relationship. The heads of the rivets 28 find ample working clearance in the holes 20 in segments 9, so that these rivets do not interfere with the tight packing of the clutch plate. In like manner, the heads of rivets 17' find ample working clearance in the holes 32, and inasmuch as the heads on the inner ends of these rivets are made as thin as, or thinner, than the leaf springs 27, as are also the heads of the inner ends of rivets 18', these rivets also do not interfere with the tight packing of the clutch plate. When the clutch is disengaged, the leaf springs 27 automatically spring back to their unflexed form, illustrated in Fig. 2, and the segments 9 and 10 being of tempered spring steel also spring back to their normal spaced parallel relationship. The substantially flat form of the leaf springs 27 as compared with variously bowed forms previously provided for mush purposes insures much closer uniformity in thickness throughout the outer facing-carrying portion of the plate and there is, therefore, avoided an objection common in many other clutch plate constructions of non-uniform engagement and proportionately non-uniform and rapid wear of the clutch plate facings and a tendency for the clutch to grab. In other words, substantially flat leaf springs can be produced in large quantities to the desired uniformity, whereas spring metal parts of complicated bowed forms cannot be produced to such close uniformity without a lot of difficulty, necessitating closer inspection and a higher percentage of rejections. The fact that the leaf springs 27 can be riveted, as at 28, directly onto one of the friction facing rings 18 along with the one set of segments 10 instead of having to be fastened first, as by welding, to one set of the segments results in easier and quicker assembling and a proportionate saving in the cost of production, and the final product is much more uniform and also far better. On the other hand, the mounting of the leaf springs 27 on the facing ring 18 has dictated the advisability of providing sliding connections between the outer end portions 26 of the leaf springs with the adjoining segments 10, so as to relieve the composition material, of which the facings rings are made, of strains due to the appreciable centrifugal force acting on the leaf springs. This force at higher speeds might otherwise tend to cause the facing material to fracture, and, of course, the breaking off of one or more portions of the facing with the leaf springs thereon would throw the plate out of dynamic balance and necessitate repair or replacement of the plate. I have, therefore, provided lugs 35 struck outwardly from the end portions 26 on each leaf spring and arranged to have a working fit in holes 36 provided therefor in the segments 10, the holes 36 being elongated sufficiently in a direction lengthwise with respect to the leaf spring to allow for the slight extent to which the end portions 26 will move laterally relative to the segments 10 in the flattening of the bowed middle portion 30 of the leaf spring.

It is believed the foregoing description conveys a good understanding of the objects and advantages of my invention. The appended claims have been drawn to cover all legitimate modifications and adaptations.

I claim:

1. In a friction clutch plate comprising a central mounting means, a pair of axially spaced annular friction facings disposed radially outward from the periphery of said mounting means, means for connecting one of said friction facings in torque transmitting relation to said mounting means and including a series of circumferentially spaced, individual, substantially flat, sheet metal friction-facing supports carried by said mounting means and extending in a generally radial direction and of equal radial length and attached to one friction facing only, each of said supports having an outer end portion disposed between said friction facings, and means for connecting the other of said friction facings in torque transmitting relation to said mounting means and including a series of circumferentially spaced, individual, substantially flat, sheet metal friction facing supports carried by said mounting means and extending in a generally radial direction and of equal radial length and attached to said friction facing only, each of said last-mentioned supports having an outer end portion disposed between said friction facings, the friction facing supports of the one series being in staggered relation to the friction facing supports of the other series, whereby the two series of supports are adapted to be compacted into substantially coplanar relationship, the improvement which consists in the provision of leaf springs, each substantially equivalent in width measured circumferentially of the plate to two of the friction facing supports and fastened on the inner side of one of said friction facings rings independently of said friction facing supports and midway between two adjacent friction facing supports that are attached to said friction facing ring, the leaf spring having end portions thereof in overlapping relation to the aforesaid two adjacent friction facing supports, said overlapping end portions having shouldered portions slidable in a direction circumferentially of the plate behind shoulders provided therefor on the aforesaid two friction facing supports, whereby the centrifugal force active upon the leaf spring is mechanically transmitted to said supports to relieve the friction facing of loads that would otherwise be imposed thereon at high R. P. M., said leaf springs having intermediate portions in abutment with adjacent friction facing supports of the other series to resist compacting of the two series of friction facing supports.

2. A friction clutch plate as set forth in claim 1, wherein each leaf spring is of appreciable length measured in a radial direction relative to said plate and has substantially parallel slots substantially parallel to a radius of the plate provided in its opposite end portions extending outwardly from the radially inner edge and spaced circumferentially of the plate from the edges of the friction facing supports that are overlapped by the end portions.

W. VINCENT THELANDER.

REFERENCES CITED

The following references are of record in the file of this patent:

UNITED STATES PATENTS

| Number | Name | Date |
|---|---|---|
| 1,931,065 | Drude | Oct. 17, 1933 |
| 2,119,026 | Reed | May 31, 1938 |
| 2,333,308 | Goodwin | Nov. 2, 1943 |
| 2,337,135 | Thelander | Dec. 21, 1943 |
| 2,477,017 | Thelander | July 26, 1949 |